ക
3,632,632
CARBOXY-TERMINATED POLYESTER RESINS
Martin Hauser and George Sidney Sprague, Stamford,
Conn., assignors to American Cyanamid Company,
Stamford, Conn.
No Drawing. Filed June 29, 1967, Ser. No. 651,100
Int. Cl. C07c 69/50
U.S. Cl. 260—485 G                                              2 Claims

ABSTRACT OF THE DISCLOSURE

New carboxy-terminated polyester resins composed of a saturated dicarboxylic acid, a saturated diol and 2-methyl-1,2,3-propanetricarboxylic acid and their use as binders in rocket propellant and explosive compositions are disclosed.

BACKGROUND OF THE INVENTION

This application relates to the field of rocket propellant compositions and more particularly to binder components for said compositions. Our new binders are polyester resins which contain sufficient 2-methyl-1,2,3-propanetricarboxylic acid so as to render the polyesters curable. The polyesters are also of such viscosity so as to facilitate mixing of solids therewith.

SUMMARY

Our new polyester resins are capable of being cured to thermoset materials having excellent physical strength while still being of sufficiently low viscosity before curing so as to enable them to be easily admixed with the other ingredients of rocket propellant or explosive compositions. The use of the 2-methyl-1,2,3-propanetricarboxylic acid results in products having unexpectedly superior properties and characteristics as compared to the use of the 1,2,3-propanetricarboxylic acid per se taught in the art.

DESCRIPTION OF THE INVENTION INCLUDING PREFERRED EMBODIMENTS

Our novel polyester resins may be represented by recurring units of the formula (I)     $\{x\} \{y\} \{z\}$ wherein $x$ is the esterification residue of a saturated dicarboxylic acid different than $z$, $y$ is the esterification residue of a saturated diol and $z$ is the esterification residue of 2-methyl-1,2,3-propanetricarboxylic acid, wherein the combined molar amount of acid is in excess of the molar amount of diol including the pendant carboxyl groups of $z$, the total amount of $z$ in the polyeser ranging from about 3.0% to about 25.0%, preferably from about 5.0% to about 15.0%, by weight, based on the total weight of the polyester.

The novel polyesters may be produced by reacting the saturated dicarboxylic acid, the saturated diol and the 2-methyl-1,2,3-propanetricarboxylic acid, at the concentrations mentioned above, at the reflux (boiling) temperature of the specific compound which is used as the solvent for the charge materials. We have found that any hydrocarbon solvent which will azeotrope with watr may be used for this purpose. Examples of representative solvents include benzene, toluene, xylene and the like. The reaction is preferably conducted at atmospheric pressure although higher or lower pressures may be utilized, if desired or necessary, provided that corresponding changes are made in the temperature to which the reaction media is heated.

The reaction should be conducted in the presence of from about 0.1–10%, preferably 1.0–3.0%, by weight, based on the weight of the charge, of a strong acid. The acid functions as a catalyst and any material known for this purpose may be used. Examples include $HNO_3$, $H_2SO_4$, HCl, $H_3PO_4$, p-toluenesulfonic acid and the like.

The reaction should be allowed to continue until the theoretical amount of water is driven off in order to insure the production of the highest molecular weight.

Examples of suitable saturated dicarboxylic acids include phthalic, oxalic, malonic, succinic, glutaric, sebacic, adipic, pimelic, suberic, azelaic, and the like.

Suitable saturated diols which may be used include ethylene glycol, diethylene glycol, propylene glycol dipropylene glycol, trimethylene glycol, hexamethylene glycol, tetramethylene glycol, $\alpha,\alpha'$-dihydroxy-p-xylene, pinacol, $\beta,\beta'$-dihydroxy-p-diethylbenzene, alkane diols, i.e. 1,4-butanediol and the like.

The polyester resins of the instant invention are generally solid waxes and, as such, it is preferable to utilize them as binders in explosives, etc. in combination with a plasticizer. Any known material may be used for this purpose with such compounds as bis-(2,2-dinitro-2-fluoroethyl) formal or those disclosed and claimed in pending U.S. application Ser. No. 619,120 filed Feb. 23, 1967, being exemplary.

The resultant plasticized compositions may then be cross-linked with any known cross-linking agent, preferably the trifunctional aziridines such as those disclosed in pending applications Ser. Nos. 605,146; 605,148 and 605,149, all filed Dec. 23, 1966 and Ser. No. 574,936, filed Aug. 25, 1966.

The bis(2,2-dinitro-2-fluoroethyl) formal is a known plasticizer and may be prepared by reacting tetranitromethane with hydrogen peroxide and sodium hydroxide to give the sodium salt of trinitromethane which is converted by direct fluorination to fluorotrinitromethane. Fluorotrinitromethane, on treatment with hydrogen peroxide and sodium hydroxide, followed by formaldehyde then results in the production of 2,2-dinitro-2-fluoroethanol. This alcohol is then converted to the formal by reaction with formaldehyde.

As mentioned briefly above, our novel polyesters are useful as binders in the preparation of rocket propellant compositions and explosives. For example, one can prepare a rocket propellant or explosive by incorporating a fuel such as aluminum, magnesium, boron, carbon, etc., oxidizers such as the chromates, dichromates, permanganates, nitrates, chlorates, and perchlorates of alkali and alkaline earth metals such as sodium, potassium, calcium and the like, ammonia; hydrazine; guanidine, etc. in our polyesters along with the above plasticizers.

The following examples are set forth by way of illustration only and are not to be construed as limitations on the present invention except as set forth in the appended claims. All parts and percentages are by weight unless otherwise specified.

EXAMPLE 1

To a suitable reaction vessel is charged a mixture of 16.16 parts of sebacic acid, 3.90 parts of 2-methyl-1,2,3-propane-tricarboxylic acid, 9.54 parts of diethylene glycol, 0.25 part of p-toluene sulfonic acid and 100 parts of xylene. The mixture is refluxed for 16 hours and water, codistilling off with xylene, is separated in a trap. The xylene is then distilled in vacuo to leave a carboxy-terminated polyester, a white, waxy solid, as the residue. The neutralization equivalent of the polymer is 681 (theoretical neutralization equivalent is 659).

EXAMPLE 2

25 weight percent of the polyester of Example 1 and 75 weight percent of bis(2,2-dinitro-2-fluoro-ethyl)-formal, as a solution, are charged to a suitable vessel. To 10.8 parts of the solution is added 0.21 part of hexahydro-1,3,5-tris-[N-(2-ethyl axiridinyl)propionyl]s-triazine. The resultant solution is blended with 12.0 parts of ammonium perchlorate and 8.0 parts of powdered aluminum. The composition is maintained at 25° C. for 24 hours and then cured at 75° C. for 4 hours in a 1 dram, 15 x 45 mm. vial. The resultant composition is a tough, resilient elastomer. The vial is placed on the compression cell of an Instron tester and a 0.125 inch diameter stainless steel rod is lowered into the sample at a constant rate of 0.02 inch/min. A trace is automatically recorded of the resistance of the elastomer to penetration and the depth of penetration. Values quoted are the resistance in pounds/sq. in. and penetration in inches at the point where the elastomer snaps.

TABLE I

| Polymer | Resistance, p.s.i. | Penetration, in. |
|---|---|---|
| A - That of Example 2 | 208 | 0.105 |
| B - As "A" but substituting tricarballylic acid for methyl-tri-carballylic acid. | 118 | 0.080 |
| C - Copolymer of sebacic acid, diethyleneglycol and trimethylolpropane (1.00/0.724/0.144). | 65 | 0.100 |

NOTE.—Comparative viscosities (Brookfield viscosity on 25% solution of polymer "C" taken as unity) : C, 1.0 ; A, 0.65 ; A, 0.52.

Following the procedures of Examples 1 and 2, above various acids and alcohols are reacted with 2-methyl-1,2,3-propane-tricarboxylic acid to produce various polyester resins which are then utilized to form rocket propellants. The acids and alcohols used are set forth in Table II, below.

TABLE II

| Ex. | Acid | Alcohol | Propellant properties | |
|---|---|---|---|---|
| | | | Resistance | Penetration |
| 3 | Adipic | Ethylene glycol | 206 | 0.101 |
| 4 | Pimelic | do | 207 | 0.103 |
| 5 | Azelaic | 1,4-butanediol | 202 | 0.098 |

What is claimed is:

1. A polyester resin produced by reacting (1) sebacic acid, (2) a saturated diol selected from the group consisting of ethylene glycol, diethylene glycol, propylene glycol, dipropylene glycol, trimethylene glycol, hexamethyene glycol, tetramethylene glycol, $\alpha,\alpha'$-dihydroxy-p-xylene, pinacol, $\beta,\beta'$-dihydroxy-p-diethylbenzene and alkane diols and (3) from about 3.0 to about 25.0%, by weight, based on the total weight of the polyester, of 2-methyl-1,2,3-propanetricarboxylic acid, the combined molar amount of acid being in excess of the molar amount of diol excluding the pendant carboxyl group of said 2-methyl-1,2,3-propanetricarboxylic acid.

2. A polyester according to claim 1 wherein the diol is diethylene glycol.

References Cited

Pinner, J. Polymer Sci., 21, 153–57 (1956).

Flory, Principles of Polymer Chem. pp. 354–356 (1953).

LORRAINE A. WEINBERGER, Primary Examiner

E. J. SKELLY, Assistant Examiner

U.S. Cl. X.R.

149—19; 260—75 R, 475 P